Patented May 2, 1944

2,348,154

UNITED STATES PATENT OFFICE 2,348,154

VINYL CHLORIDE COPOLYMERS

Winfield Scott and Raymond B. Seymour, Akron, Ohio, assignors to Wingfoot Corporation, Wilmington, Del., a corporation of Delaware No Drawing. Application April 22, 1939, Serial No. 269,407

13 Claims. (Cl. 260—86)

This invention relates to polymerization products prepared by the copolymerization of vinyl chloride and vinylidene chloride and, more particularly, to copolymers of these two substances which are soluble in organic solvents.

Vinyl chloride and vinylidene chloride have heretofore been polymerized in mixture to yield resinous masses but these are either insoluble or are unstable to heat and light or subject to both of these objections. The present invention concerns a method of preparing copolymers of these two monomeric materials which are soluble in organic solvents, particularly in chlorinated hydrocarbon solvents and which are, moreover, stable to heat and light, thus rendering them suitable as coating materials for textiles and for other uses.

In the method employed, the vinyl and vinylidene chlorides are heated in an aqueous emulsion at a moderate temperature, say, between 20 and 80° C. and preferably from 25–50° C. until polymerization is complete or until a suitable product can be removed from the latex present. The two monomers should be reacted in proportions from 45–95 parts of vinyl chloride and 55–5 parts of the vinylidene chloride, since it is found that less than 5% of vinylidene chloride results in an insoluble product while the resins do not begin to display stability to light and heat until at least 45 parts of the vinyl chloride are present in the product and preferably should contain at least 80% for satisfactory stability. A particularly useful resin is made from 90 parts of vinyl chloride and 10 parts of vinylidene chloride since, at this point, the product is still soluble in organic solvents and is quite stable.

The method of making these copolymers is also a part of the invention, the conditions employed having a profound effect on the yield and product obtained. Thus, the polymerization is carried on in an aqueous emulsion containing from 1–2 parts by weight of water on the total monomers present and an emulsifying agent is used, the nature of this emulsifying agent being critical in that certain emulsants result in little or no yield of polymer. Those emulsifying agents which have been found to result in high yields of product are illustrated by Aquarex D, a material which is chiefly made up of the sodium salts of sulfate mono esters of mixed lauryl and myristyl alcohols. This material has been found to give excellent results and is preferred; however, there may also be used other organic sulfates or organic sulfonates, as well as the alkali metal salts and other soluble salts of such organic sulfates and organic sulfonates, provided that each of these contains an aliphatic radical in the molecule. Examples of these are Nekal, a sodium alkyl naphthalene sulfonate; Wetanol, a modified sulfonated fatty acid ester; Aquarex F, a sodium salt of isopropyl naphthalene sulfonic acid; Nopio C. A. P., a sulfonated hydrocarbon; Emulphor; Emulsifier 83A; Aerosol O. S., and alkyl aryl sulfonate; Gardinol W. A., an alcohol sulfate; Sulfatate, a hydrocarbon sulfonate; Twitchell's oil D. S., a sulfonated compound; and others of similar nature.

There may also be present in the emulsion an oxidizing catalyst, preferably hydrogen peroxide, but including also ammonium perchlorate, potassium permanganate, sodium persulfate, sodium perborate, ammonium perborate, and other compounds containing a high proportion of combined oxygen, some of which is readily given up. These compounds and others of the same class are included by the term "oxidizing catalysts."

It is also desirable to maintain the hydrogen ion concentration of the emulsion above pH 6.0 and preferably above pH 6.5 and, to this end, a buffer is employed adapted to maintain such a hydrogen ion concentration. Such buffers are well known but there may be mentioned disodium phosphate + citric acid, sodium hydroxide + mono potassium phosphate, and sodium hydroxide + boric acid.

Methods have heretofore been described for the copolymerization of vinyl chloride and vinylidene chloride but these usually gave very poor yields or did not yield a soluble product. Thus, the polymerization when conducted in the presence of sodium oleate gives very poor yields. Indeed, when a 75–25 mixture of vinyl and vinylidene chlorides was polymerized in the presence of sodium oleate in an aqueous emulsion at a temperature of 48° C., using hydrogen peroxide as catalyst, yields of only 0.3% were obtained at the end of 20 hours. Results were not much better when equal parts of the two monomers were treated, a run of 24 hours yielding only from 8–10% of product. A copolymer from 90 parts of vinyl and 10 parts of vinylidene chloride could not be made using sodium oleate under the conditions set forth.

In contrast to this, yields ranging from 90–95% may be obtained by the practice of the present invention. A typical run follows:

Example 1

To 60 parts of water is added 1.5 parts of Aquarex D, 0.72 part of disodium phosphate, 0.11 part of citric acid, and 0.4 part of sodium perborate. To this is added 1.6 parts of carbon tetrachloride, 35 parts of monomeric vinyl chloride and 15 parts of monomeric vinylidene chloride. This emulsion is placed in a closed reaction vessel, such as a bomb, and heated with agitation until polymerization is complete, as evidenced by the contents of the reaction vessel forming a solid or by absence of positive pressure. At 32° C. polymerization is completed in approximately 16–20 hours, whereupon the product settles out of solution as a powder. Any product remaining in solution may be precipitated out by addition of alcohol or may be salted out by a suitable salt, such as aluminum chloride. The polymer is then washed with water to remove water soluble material and, after drying, is obtained in almost theoretical yield as a white powder soluble in ethylene dichloride.

However, the reaction need not be continued until polymerization is complete but may be stopped before action has ceased, the polymer thus obtained being useful for certain purposes and having the same solubility characteristics as when polymerization is allowed to continue.

The product obtained is soluble in such solvents as ethylene dichloride, dioxane, butyl acetate, amyl acetate, hexalin acetate, 2-nitro propane, diethyl oxalate, 1-2-dichlor cyclohexane, styrene, and chloro benzene. The solubility in ethylene dichloride particularly characterizes the new copolymers. This solubility shows that the resin is a new product and not a mixture of the polymers of vinyl chloride and of vinylidene chloride, neither of which is appreciably soluble in the foregoing solvents, with the exception that poly vinyl chloride which has been made under the same conditions as the copolymer is soluble in chloro benzene.

*Example 2*

To 60 parts of water in a suitable pressure apparatus is added 1.5 parts of Nekal BX (a sodium salt of isopropyl naphthalene sulfonic acid), 0.875 part of disodium phosphate, 0.01 part of citric acid and 0.4 part of sodium perborate. To this solution is then added 45 parts of vinyl chloride and 5 parts of vinylidene chloride together with 1.6 parts of carbon tetra chloride. The mixture was heated at 34° C. for 20 hours with agitation and a yield of 80% was obtained of a 90–10 vinyl chloride vinylidene chloride copolymer.

*Example 3*

Using the same proportions of water, Aquarex D, sodium perborate and citric acid as employed in Example 1 above, a mixture of 35 parts of vinyl chloride and 15 parts of vinylidene chloride in an emulsion buffered to a hydrogen ion concentration of pH 8 was prepared. This was subjected to a temperature of 32° C. with agitation for 20 hours and gave a yield of 90% of the theoretical.

*Example 4*

To illustrate the use of different oxidizing catalysts, 45 parts of vinyl chloride and 5 parts of vinylidene chloride were placed in 60 parts of water containing 1.5 parts of Aquarex D, 0.4 part of potassium permanganate, 0.72 part of disodium phosphate, 0.11 part of citric acid and 1.6 parts of carbon tetra chloride. The mixture was subjected to polymerizing conditions at 32° C. for a period of 15 hours to obtain a yield of 90% of the theoretical.

*Example 5*

The run described in Example 4 was duplicated except that the potassium permanganate was replaced by the same amount, 0.4 part, of sodium perborate. In 20 hours at a temperature of 32° C. a yield of 97% of the copolymer was obtained.

*Example 6*

In this example, similar proportions of ingredients were employed as in Example 1 but the amount of water was cut from 60 parts to 30 parts. A run of 15 hours at 32° C. gave a yield of 95%.

As stated, the proportions of the two monomers should be maintained between 95 parts and 45 parts by weight of vinyl chloride and between 5 and 55 parts by weight of vinylidene chloride since more than 95 parts and less than 45 parts of vinyl chloride tends to render the copolymer insoluble in the solvents mentioned. Also, the polymerization should be carried on in an aqueous emulsion since the nature of the reaction medium also affects the properties of the product.

While there has been described above a preferred embodiment of the invention, it will be apparent that the method is subject to modification within the scope of the invention set forth herein, other emulsifying agents of the class described being useful and various catalysts in addition to those mentioned being suitable in the process. It is intended, therefore, that the patent shall cover by suitable expression in the accompanying claims all features of patentable novelty residing in the invention.

What we claim is:

1. A method of preparing copolymers of vinyl chloride and vinylidene chloride which comprises polymerizing a mixture of the two containing more than 45% and less than 95% of the vinyl chloride and more than 5% and less than 55% of the vinylidene chloride in an aqueous emulsion containing an emulsifying agent from the class consisting of organic sulfates, organic sulfonates, alkali metal salts of organic sulfates and alkali metal salts of organic sulfonates, each of which contains an aliphatic radical.

2. A method of preparing copolymers of vinyl chloride and vinylidene chloride which comprises polymerizing a mixture of the two containing more than 45% and less than 95% of the vinyl chloride and more than 5% and less than 55% of the vinylidene chloride in an aqueous emulsion containing an organic sulfate having an aliphatic radical therein.

3. A method of preparing copolymers of vinyl chloride and vinylidene chloride which comprises polymerizing a mixture of the two containing more than 45% and less than 95% of the vinyl chloride and more than 5% and less than 55% of the vinylidene chloride in an aqueous emulsion containing an alcohol sulfate.

4. A method of preparing copolymers of vinyl chloride and vinylidene chloride which comprises polymerizing a mixture of the two containing more than 45% and less than 95% of the vinyl chloride and more than 5% and less than 55% of the vinylidene chloride in an aqueous emulsion containing a sodium salt of an alcohol sulfate.

5. A method of preparing copolymers of vinyl chloride and vinylidene chloride which comprises polymerizing a mixture of the two containing more than 45% and less than 95% of the vinyl chloride and more than 5% and less than 55% of the vinylidene chloride in an aqueous emulsion containing a sodium salt of a sulfate mono ester of a fatty alcohol.

6. A method of preparing copolymers of vinyl chloride and vinylidene chloride which comprises polymerizing a mixture of the two containing more than 45% and less than 95% of the vinyl chloride and more than 5% and less than 55% of the vinylidene chloride in an aqueous emulsion containing the sodium salts of sulfate mono esters of mixed higher fatty alcohols.

7. A method of preparing copolymers of vinyl chloride and vinylidene chloride which comprises polymerizing a mixture of the two containing more than 45% and less than 95% of the vinyl chloride and more than 5% and less than 55% of the vinylidene chloride in an aqueous emulsion containing the sodium salts of sulfate mono esters of mixed lauryl and myristyl alcohols.

8. A method of preparing copolymers of vinyl chloride and vinylidene chloride which comprises polymerizing a mixture of the two containing more than 45% and less than 95% of the vinyl chloride and more than 5% and less than 55% of the vinylidene chloride in an aqueous emulsion containing an oxidizing catalyst and an emulsifying agent from the group consisting of organic sulfates, organic sulfonates, alkali metal salts of organic sulfates and alkali metal salts of organic sulfonates, each of which contains an aliphatic radical.

9. A method of preparing copolymers of vinyl chloride and vinylidene chloride which comprises polymerizing a mixture of the two containing more than 45% and less than 95% of the vinyl chloride and more than 5% and less than 55% of the vinylidene chloride in an aqueous emulsion containing an oxidizing catalyst, a buffer adapted to maintain a hydrogen ion concentration above pH 6.0 and an emulsifying agent from the group consisting of organic sulfates, organic sulfonates, alkali metal salts of organic sulfates and alkali metal salts of organic sulfonates, each of which contains an aliphatic radical.

10. A method of preparing copolymers of vinyl chloride and vinylidene chloride which comprises polymerizing at a temperature between about 20° and 80° C. a mixture of the same in an aqueous emulsion containing an oxidizing catalyst, a buffer adapted to maintain a hydrogen ion concentration above pH 6.0 and an emulsifying agent from the group consisting of organic sulfates and alkali metal salts of organic sulfonates, each of which contains an aliphatic group.

11. A method of preparing copolymers of vinyl chloride and vinylidene chloride which comprises polymerizing a mixture of the two containing more than 45% and less than 95% of the vinyl chloride and more than 5% and less than 55% of the vinylidene chloride in an aqueous emulsion containing an oxidizing catalyst, a buffer adapted to maintain a hydrogen ion concentration above pH 6.0 and a sodium salt of an alcohol sulfate.

12. A method of preparing copolymers of vinyl chloride and vinylidene chloride which comprises polymerizing a mixture of the same in an aqueous emulsion containing from one to two parts by weight of water to total monomers and said monomers being present in the ratio of 45 to 95 parts of vinyl chloride to 55 to 5 parts of vinylidene chloride, an oxidizing catalyst, a buffer adapted to maintain a hydrogen ion concentration above pH 6.0 and an emulsifying agent which is an alcohol sulfate.

13. A method of preparing copolymers of vinyl chloride and vinylidene chloride which comprises polymerizing a mixture of the two containing more than 45% and less than 95% of the vinyl chloride and more than 5% and less than 55% of the vinylidene chloride in an aqueous emulsion containing hydrogen peroxide, a buffer adapted to maintain a hydrogen ion concentration above pH 6.0 and an emulsifying agent which is chiefly the sodium salts of sulfate mono esters of mixed lauryl and myristyl alcohols.

WINFIELD SCOTT.
RAYMOND B. SEYMOUR.